United States Patent
Pham (10) Patent No.: US 10,068,519 B2
(45) Date of Patent: Sep. 4, 2018

(54) METHODS AND ERGONOMIC KEYBOARD FOR DATA ENTRY WITH MODULAR KEYBOARD HOUSING AND BUILT-IN TOPLIGHTS

(71) Applicant: Hau Pham, San Diego, CA (US)

(72) Inventor: Hau Pham, San Diego, CA (US)

( * ) Notice: Subject to any disclaimer, the term of this patent is extended or adjusted under 35 U.S.C. 154(b) by 0 days.

(21) Appl. No.: 14/513,202

(22) Filed: Oct. 13, 2014

(65) Prior Publication Data

US 2016/0103503 A1    Apr. 14, 2016

(51) Int. Cl.
*G06F 3/023*    (2006.01)
*G09G 3/32*    (2016.01)
*G06F 3/02*    (2006.01)

(52) U.S. Cl.
CPC ............. *G09G 3/32* (2013.01); *G06F 3/0202* (2013.01); *G06F 3/0208* (2013.01); *G06F 3/0213* (2013.01); *G06F 3/0216* (2013.01); *G09G 2300/08* (2013.01)

(58) Field of Classification Search
CPC .... G06F 3/0215; G06F 3/0219; G06F 3/0221; G06F 3/0208
See application file for complete search history.

(56) References Cited

U.S. PATENT DOCUMENTS

| | | | |
|---|---|---|---|
| 2,040,248 A | 5/1936 | Dvorak | |
| 5,144,567 A | 9/1992 | Oelsch | |
| 5,660,488 A * | 8/1997 | Miller | G06F 3/0219 340/407.2 |
| 5,689,253 A * | 11/1997 | Hargreaves | B41J 5/10 341/22 |
| D387,340 S * | 12/1997 | Pham | D14/393 |
| 5,731,808 A * | 3/1998 | Gaither | G06F 3/0216 341/22 |
| 6,279,861 B1 * | 8/2001 | Nolan | F16M 11/10 248/188.2 |
| 6,379,060 B1 * | 4/2002 | Louis | B41J 5/10 248/118.3 |
| 8,011,557 B1 * | 9/2011 | Zhang | B23K 1/0016 228/4.5 |
| 8,853,577 B1 | 10/2014 | Tom | |
| 2003/0227766 A1 * | 12/2003 | Hom | G06F 3/0202 362/23.03 |
| 2005/0100382 A1 * | 5/2005 | Tzeng | G06F 3/0208 400/472 |
| 2008/0133803 A1 * | 6/2008 | Liu | G06F 3/0202 710/64 |

(Continued)

FOREIGN PATENT DOCUMENTS

| | | | | |
|---|---|---|---|---|
| GB | 2421220 A | * | 6/2006 | A61L 2/10 |
| WO | WO2014172848 A1 | * | 10/2014 | |

OTHER PUBLICATIONS

Hirose Electric ZX Series USB connector datasheet, Aug. 2010.*

*Primary Examiner* — Benjamin C Lee
*Assistant Examiner* — Dong Hui Liang (57) ABSTRACT

The present invention incorporates unique methods and components for data entry and typing using the components including an ergonomic keyboard with substantially and uniformly low-profile key elevation in combination with built-in germicidal, non-germicidal light-emitting diodes (LEDs) and laser lights to disinfect and illuminate surface of the lowly situated key caps and adjacent affected surfaces.

1 Claim, 10 Drawing Sheets

Isometric View of Feet Mounted to Rear Edge (56) References Cited

U.S. PATENT DOCUMENTS

| | | | |
|---|---|---|---|
| 2008/0291170 A1* | 11/2008 | Yang | G06F 3/021 |
| | | | 345/168 |
| 2009/0261991 A1* | 10/2009 | Su | G06F 3/0213 |
| | | | 341/22 |
| 2011/0243789 A1* | 10/2011 | Roberts | A61L 2/10 |
| | | | 422/24 |
| 2012/0266021 A1* | 10/2012 | Tian | G06F 11/2733 |
| | | | 714/27 |
| 2015/0370737 A1 | 12/2015 | Perkins | |
| 2016/0196937 A1* | 7/2016 | Ding | H01H 13/83 |
| | | | 200/5 A |

* cited by examiner

FIG. 1 – An Ornamental Design Invented by Applicant

FIG. 2 – Existing Touch Typing Method for QWERTY Keyboard

FIG. 3 – A Plurality of Keys in Left Section, Middle Section, and Right Section

FIG. 4 – Convexly-shaped Top Surface of Left and Right Space Bar, Shift Key

FIG. 5A – Built-in Light-Emitting Diodes (LEDs), Laser Lights Assemblies

FIG. 5B – LEDs modules

FIG. 6 – Crossed-sectional View of Present Invention

FIG. 7 – Exploded View of the Multiple Layers Keyboard Housing

FIG. 8 – Bottom View of Top Layer with Fasteners

FIG. 9 – Second, Third, and Fourth Layers with Perforated Holes

FIG. 10 – Bottom View of 4th Layer with Fasteners

FIG. 11 – Opening for Connecting Interface to Keyboard

FIG. 12 – Integral Receptacle

FIG. 13 – Tangle-Free Cable at Various Lengths

FIG. 14 – Optimal Angles of Keys Arrangement

FIG. 15 – Isometric View of Feet Mounted to Front Edge

FIG. 16 – Isometric View of Feet Mounted to Rear Edge

FIG. 17 – Side View of the Adjustable, Detachable, Attachable Feet at Lowest Level FIG. 18 – Side View of the Adjustable, Detachable, Attachable Feet at Medium Level FIG. 19 – Side View of the Adjustable, Detachable, Attachable Feet at Highest Level FIG. 20 – Isometric View of Adjustable, Detachable, Attachable Feet

METHODS AND ERGONOMIC KEYBOARD FOR DATA ENTRY WITH MODULAR KEYBOARD HOUSING AND BUILT-IN TOPLIGHTS

BACKGROUND OF THE INVENTION

1. Field of the Invention

This invention relates to input devices and in particularly computers with ergonomically improved keyboards and built-in light-emitting diodes (LEDs) and laser lights for disinfecting and illuminating surface of keys.

2. Description of the Prior Art

In the original typewriters, each key was attached to a lever. In the typewriters and modern computer keyboards, each row was arranged diagonally to leave space for the adjacent row of keys leading to a zigzagged pattern between rows, and each row of keys are arranged in straight-line formation. In addition, the distance between the shoulders of a human operator is further apart than the width of the keyboard, therefore the operator's hands are cramped and twisted at an unnatural angle by actuating the keys in tight space with unnaturally projected movements of the fingers and wrists that may lead to carpal tunnel syndromes. Studies have revealed that the operator's wrists are at risk of being injured during long periods of typing when the tilt of the keyboard's hands are at an upward or positive angle (extension posture). Several prior arts, while attempting to solve the above issues by rearranging the location, sequence, elevation, angle, and shape of the keys, were unable to solve all the mentioned problems.

Researchers have found that computer keyboards can harbor a significant amount of harmful bacteria, which can cause severe health affects to the operator, especially in the hospitals or health care clinics. A prior art attempted to solve this issue by using ultraviolet light (UV) lamps in a motorized hood, housing with physically bulky embodiments, complex alternating current (AC) electrical components that are expensive to make, yet ineffective, because of the limited scope of the UV tubes that was developed in the early 1900s. Another limitation of the prior art is that it would be non-operational if the keyboard was in operational mode or in used by an operator to enter data.

For operators who are not touch-typing, it is a challenge to find the right key in the low light environment. Prior arts attempted to provide light source for keyboards in low light environment by introducing backlit or backlighted keyboards. Light-emitting diodes (LEDs) are embedded into the circuit below each key. Each key cap must be engraved by a laser beam to represent an alphanumeric or a non-alphanumeric character that is associated with that particular key. Thus a translucent or alike substance is filled in the engraved groove to allow light to pass through from underneath. However, these keyboards are complicated and expensive.

Since the invention of the computers in the 1930s, the keyboards have been commonly made and sold in white and black colors. The desire to own a keyboard in different colors or to have a customized printed designs is improbable at the present. Keyboard manufacturers are not producing keyboards in variety of colors because of the high production costs and time-consuming processes to produce keyboard housings in different colors if they are not efficiently adaptable or interchangeable. A conventional keyboard is constructed of an upper housing and a lower housing, which are joined by exposed or hidden screws or clips to house internal components that cause difficulties to assemble or disassemble the keyboard.

A conventional wired keyboard is manufactured using either a PS/2, USB, or alike cable structure which comprises several wires that are soldered to a printed circuit board (PCB), which is inside a keyboard housing. One end of the cable connects to the keyboard housing, while the other connects to a computer to allow an operator to send instructions from the keyboard to the computer. The cable of the conventional wired keyboard is made in fixed lengths. At times, the keyboard is required to be placed far apart from the computer or close to the computer for reasons such as space limitation, accessibility, safety or security concern, neatness, and so forth. The conventional wired keyboard must use a cable extender or adapter that is fixed, lengthy, and expensive. The cable extender or adapter would have length of about one (1) meter or longer that may not fit the exact distance of the newly extended arrangement, leaving unused segment of the cable to be tangled that may cause an unsafe and cluttering environment. In contrast, the only option for shortening the cable is to roll or fold the long cable and fasten it with a rubber band or a cable tie. Furthermore, manually soldering individual wires to the PCB is a time-consuming and costly process that is prone to defects. In addition, the longwinded cable that protrudes at the rear or bottom of the keyboard housing has been an issue for manufacturers to achieve automated assembling, quality control processes, and efficient packaging.

BRIEF SUMMARY OF THE INVENTION

The object of the invention is to create an adaptable, distinct, and ergonomic keyboard, which is to incorporate the methods, functions, and features to overcome the aforementioned problems associated with prior arts and the needs that have not been fulfilled.

The object of the invention is to provide an ergonomic keyboard, which comprises a plurality of keys that are grouped into a left section, a middle section, and a right section to enhances postures for an operator's fingers, hands, wrists, arms, and cognitive experience by arranging keys in straight rows and columns at an angle in different sections to allow typing efforts to be distributed to dominant fingers consisting of index fingers and thumbs.

Thurs, another object of the invention is to provide an ergonomic keyboard, which comprises a middle section having frequently used and elongated keys to be efficiently accessed by an operator's dominant index fingers or thumbs. Furthermore, the middle section provides wider space between the operator's left and right hand so that the operator's hands and wrists are straight and at a neutral angle to alleviate ulnar deviation (ulnar flexion) injury.

Another object of the invention is to provide an ergonomic keyboard which allows lightwaves from built-in germicidal and non-germicidal light-emitting diodes (LEDs) and laser lights for disinfection and illumination the surface of key caps and periphery of a modular keyboard housing.

Another object of the invention is to provide an ergonomic keyboard which has interchangeably adjustable, attachable, and detachable feet.

It is another object of the invention to provide an ergonomic keyboard which has an integral receptacle that is directly embedded to a printed circuit board (PCB) inside a keyboard housing to allow an interface (wired) in various lengths, protocols to efficiently connect and communicate to a computer, or an electronic device in various distances. The integral receptacle may be assembled by an automated or non-human system for efficiency in manufacturing and packaging.

Other objects of the invention are described in drawings below.

BRIEF DESCRIPTION OF THE DRAWINGS

The ergonomic keyboard of the invention is further described with reference to the accompanying drawings in which.

DETAILED DESCRIPTION OF THE INVENTION

Figure 1:
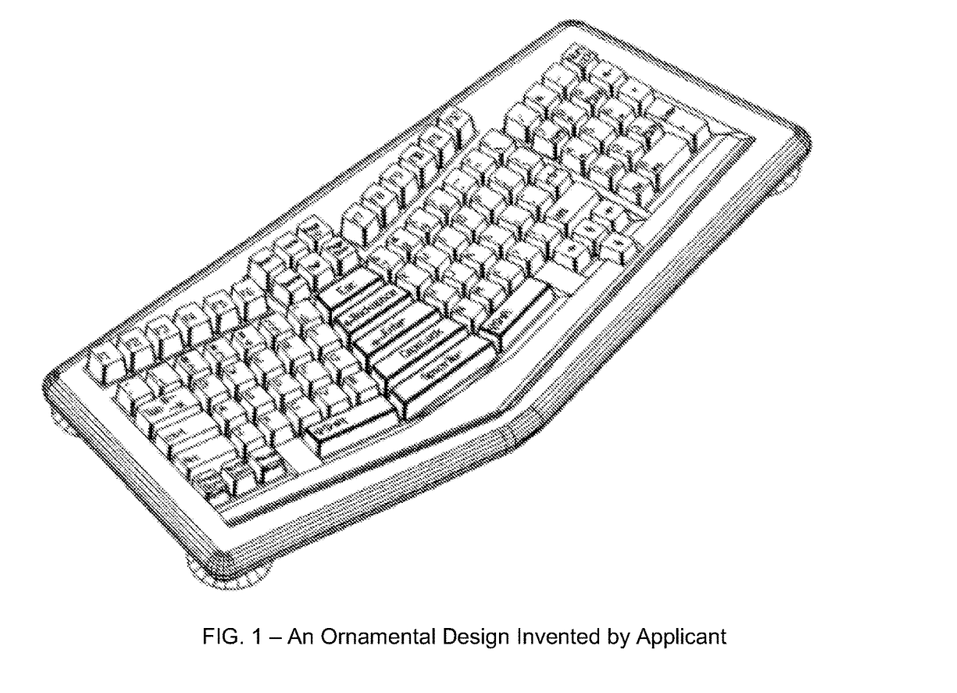
FIG. 1 illustrates the exemplary non-limiting structure(s) of an ornamental design of an ergonomic keyboard invented by the applicant.

The ergonomic keyboard referring to FIG. 1 presents an ornamental design patent that awarded to the applicant in 1995. The features and functions of this invention are further illustrated below.

Figure 2:
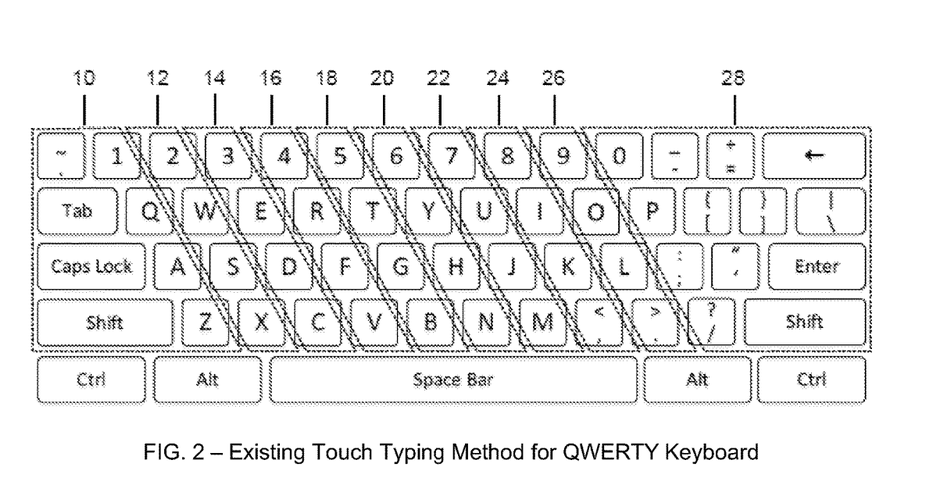
FIG. 2 illustrates the exemplary non-limiting structure(s) of QWERTY keys arrangement and current methods for sending instructions to a computer or an electronic device.

FIG. 2 illustrates QWERTY key arrangement, which forces an operator's wrists to be placed at unnatural postures. The operator has to bend the left hand to the left to type the keys as shown in [10, 12, 14, 16]. The little fingers (weakest fingers) have to handle more keys than other fingers as shown in zones [10, 28], comparing to index [16, 18, 20, 22], middle [14, 24], and ring fingers [12, 26]. The right little finger of the operator is required to reach ENTER, right SHIFT, BACKSPACE keys that may lead to ulnar deviation or ulnar flexion disorder. The left and right hands are forced to be confined as the fingers are placed in the home rows.

Figure 3:
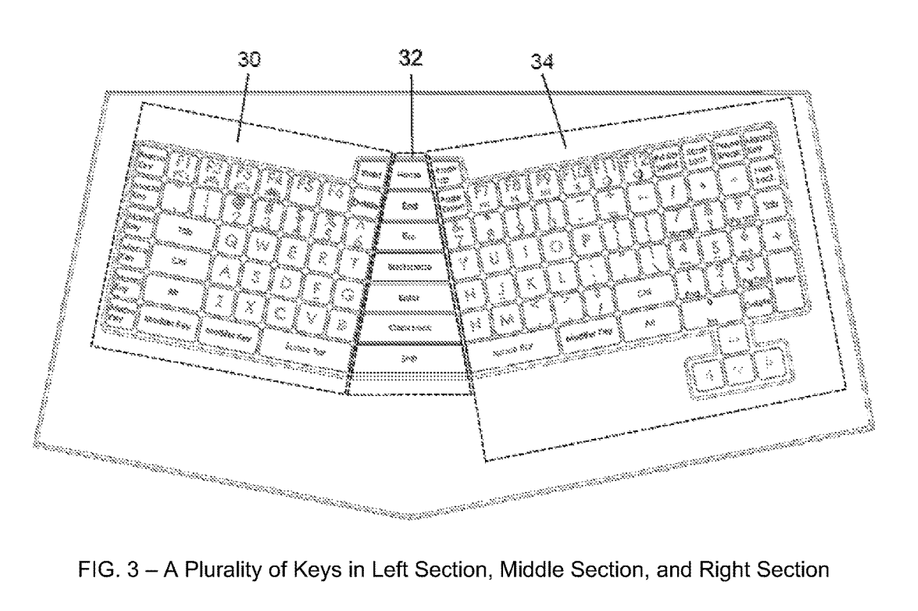
FIG. 3 illustrates the exemplary non-limiting structure(s) of the top view of the invention, which comprises a left section, a middle section, and a right section.

FIG. 3 illustrates the present invention comprising a plurality of keys that are grouped in a left section [30], a middle section [32], and a right section [34] that are significantly and uniformly lower than the top surface of the keyboard housing. The left section is used by the operator's fingers of the left hand. The middle section is used by the operator's left index or right index finger. The right section is used by the operator's fingers of the right hand.

Figure 14:
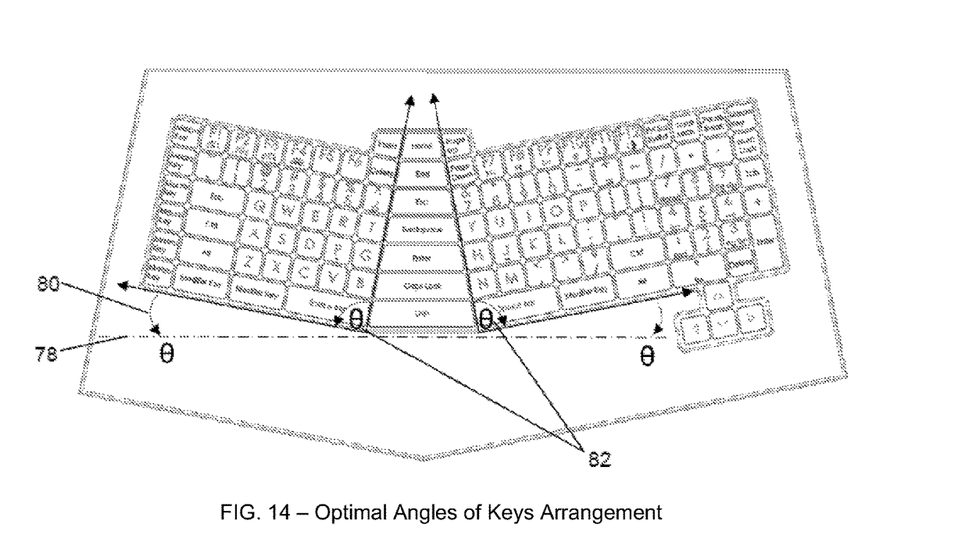
FIG. 14 illustrates the exemplary non-limiting structure(s) of optimal angles of the present invention.

The keys in the left section [30] and right section [34] are arranged in the grid formation or non-staggered [30, 34] at an angle [80], shown in relative to a horizontal reference line [78] in FIG. 14. Commonly used keys in various non-limiting embodiments described in exemplary details above such that the upper rows comprise keys Q, W, E, R, T, U, I, O, and P. The home rows comprise keys A, S, D, F, G, H, J, K, L, and non-alphanumeric characters, which are vertically adjacent to the upper row. Vertically adjacent to the home row, the lower rows comprise keys Z, X, C, V, B, N, M, and non-alphanumeric keys. The order of the rows and keys are listed in sequence from left-to-right and top-to-bottom. For an operator who plays video games on a computer, keys W, A, S, and D (WASD cluster) have been essential. The present invention has key W in vertically adjacent to the S key. Hence, the left ring finger can vertically move up-and-down instead of zigzagged movements in a conventional keyboard.

The middle section [32] comprises HOME, END, ESCAPE (Esc), BACKSPACE, ENTER, CAPS LOCK, and SHIFT keys. The order of the keys is listed in sequence from top-to-bottom. The keys in the middle section can be actuated by the dominant left index or right index finger with natural posture for the hands, wrists, and efficient movement, and capacity for the fingers. For an operator who uses UNIX or Linux operating system for typing, the ability to efficiently access the ESCAPE key is essential.

The new key arrangement as shown in FIG. 3 allows an operator to use the dominant index, middle, ring fingers and thumbs to efficiently actuate more keys. The FUNCTION keys (F1 through F12) are positioned right above the NUMBER keys to provide easy access for the index, middle, and ring fingers as they are placed on the home rows. The EDITING keys (INSERT, HOME, PAGE UP, DELETE, END, and PAGE DOWN) are located close to the home rows and at a focal location so that the operator can maintain their continuous focus while typing.

Figure 4:
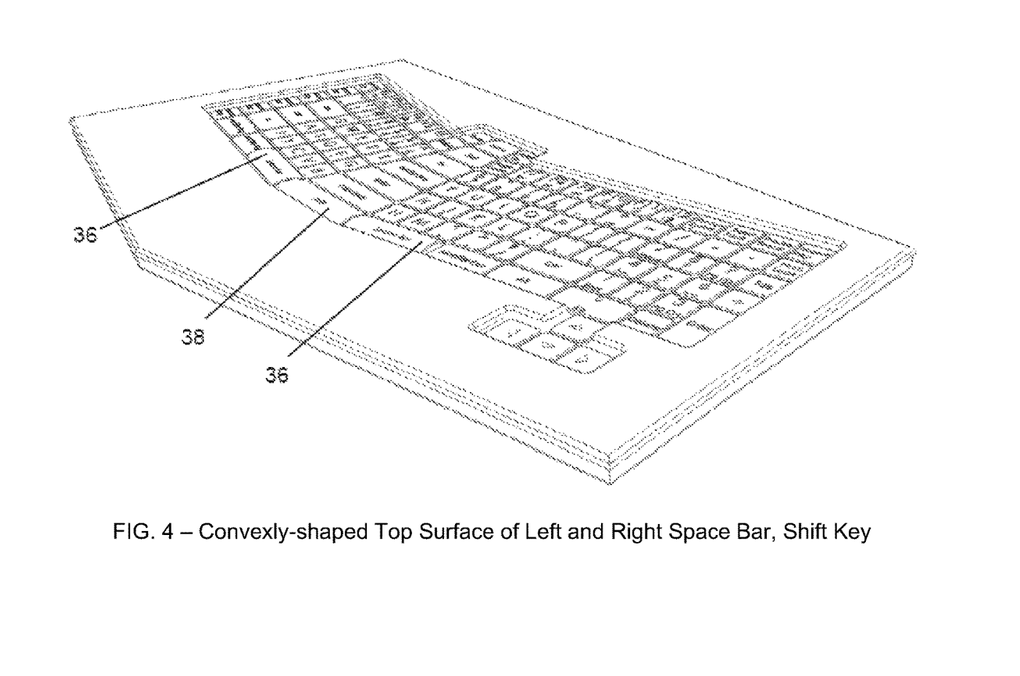
FIG. 4 illustrates the exemplary non-limiting structure(s) of a convexly-shaped top surface left SPACE BAR, a convexly-shaped top surface SHIFT key in between, and a convexly-shaped top surface right SPACE BAR.

FIG. 4 illustrates the SPACE BAR keys [36] and SHIFT key [38] that are ergonomically constructed by having the convexly-shaped top surface to provide easy access for the thumbs to actuate these keys from a higher elevation when an operator's palms are place on the top surface of the keyboard housing as indicated FIG. 3.

Figure 5A:
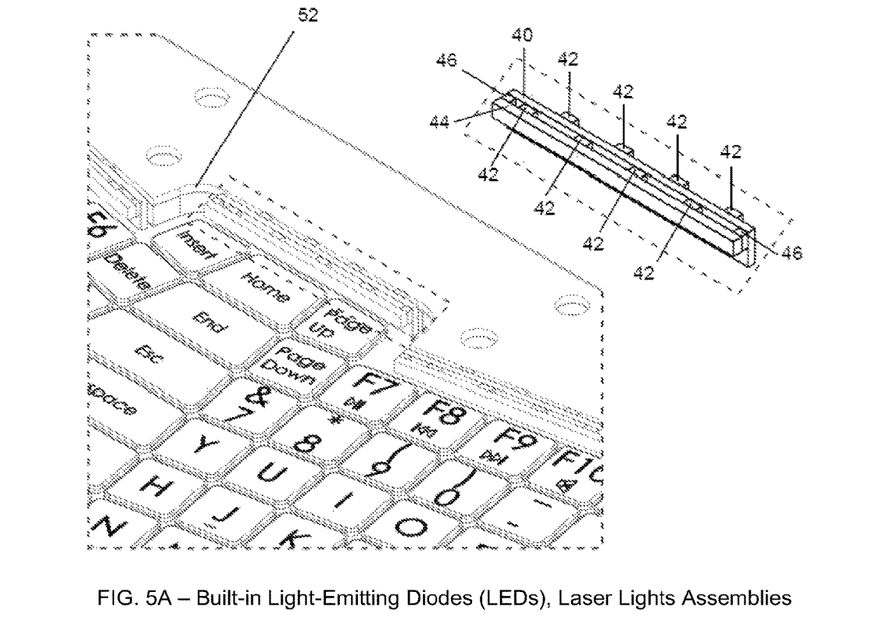
FIG. 5A illustrates the exemplary non-limiting structure (s) of the germicidal and non-germicidal light-emitting diodes (LEDs) lights assemblies comprising LED lights, circuit board, anchoring or mounting pieces, and transparent or translucent filter or light guide or light pipe.

FIG. 5A illustrates the non-limiting embodiment of a light-emitting diode (LED) assembly comprising a printed circuit board (PCB) [40], light-emitting diodes (LEDs) [42], a light guide or light pipe [44], and anchoring pieces [46] that provide invisible and visible wavelengths, which are capable of illuminating and disinfecting with germicidal and non-germicidal lightwaves, to be projected onto the surface of keycaps and periphery. The LEDs [42] are mounted at a higher elevation, relative to the surface of the keycaps, so that the lightwaves are consistently transmitted onto the keycaps and through the internal edge of a transparent, translucent layer to the periphery of the modular keyboard housing [52].

Figure 5B:
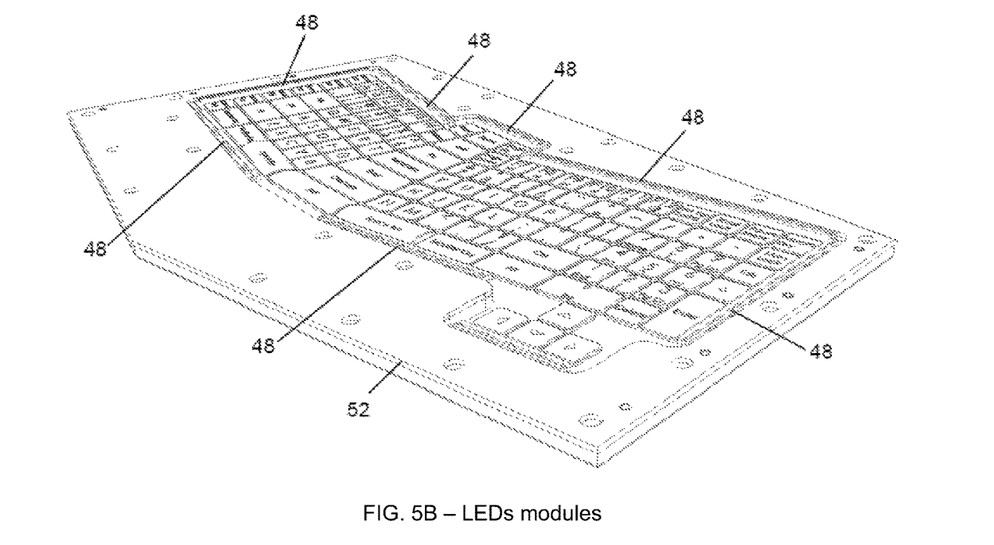
FIG. 5B illustrates the exemplary non-limiting structure (s) of the LED modules.

The purpose of having the LED modules, as shown in FIG. 5B, at higher elevation in various locations is to reduce the quantity of LEDs needed to broadcast sufficient lightwaves over a large surface with fewer LEDs. Since LEDs are constructed of semiconductor chips, the LEDs are operating at low currents and low temperatures, and therefore they are efficient in power consumption and have a longer lifetime. Another advantage of LEDs is their ability to be programmed into a wide range of frequencies to achieve efficacy to disinfect different types of bacteria, and emitting lightwaves in different colors. LEDs semiconductor chips are encapsulated in a solid form; hence they are shock-resistant, unlike fluorescent and incandescent lamps.

FIG. 5B illustrates the exemplary non-limiting structure(s) of the light-emitting diode (LED) modules [48] that are installed inside the modular keyboard housing at numerous locations to provide sufficient and effective lightwaves to serve the intended purposes and functions.

Figure 6:
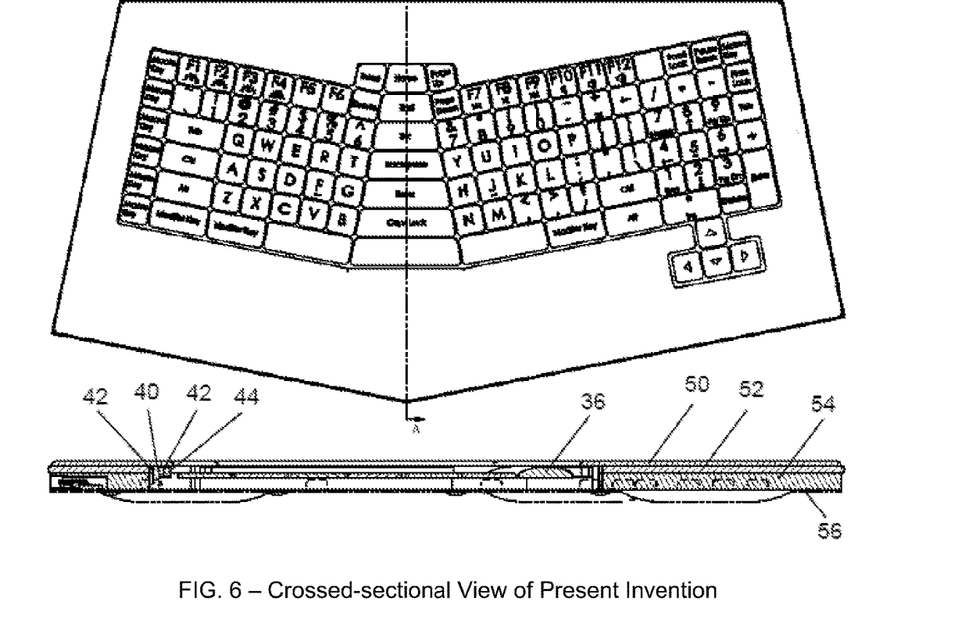
FIG. 6. Illustrates the exemplary non-limiting structure(s) of the embodiments in cross-sectional view of the present invention.

FIG. 6 illustrates the exemplary non-limiting structure(s) of the embodiments in cross-sectional view to show various layers [50, 52, 54, 56] of the present invention. [42] depicts LEDs and/or laser lights that are mounted to the printed circuit board (PCB) [40] that provides an interface to the power source for at least one or more LED(s) and laser light. The light guide or light pipe [44] is placed in front of the LEDs and/or laser lights so that lightwaves can be efficiently emitted onto the surface of the keycaps and periphery.

Figure 7:
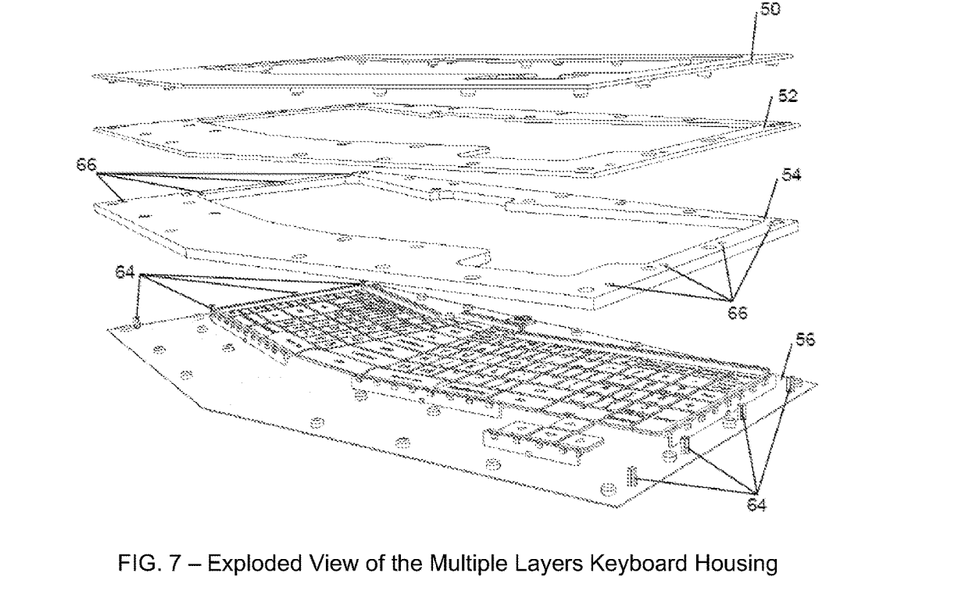
FIG. 7 illustrates the exemplary non-limiting structure(s) of the exploded view of modular embodiments of the present Invention.

FIG. 7 illustrates the exemplary non-limiting structure(s) of the modular embodiments of the keyboard housing, which comprises a swappable top layer [50], a transparent or translucent layer [52], a main frame layer [54], a bottom layer [52], and push-in pins [64].

The top layer can be removed and exchanged by gently lifting the top layer at locations from the modular keyboard housing where the fasteners are located. To install the top layer, align the fasteners [58] with the perforated holes [60] along the edge of the keyboard housing and slowly lower the top layer [50] until its bottom firmly rests on the top surface of the second layer [52].

To swap the second layer [52], first remove the first layer [50] following the previous steps. Gently lift the second layer [52] at locations where the push-in pins [64] are located until the second layer [52] is completely free from the modular keyboard housing. For installation, align the push-in pins [64] with the perforated holes [66] in the second layer [52] and slowly drop the second layer [52] until its bottom surface rests firmly on the top surface of the main frame layer (3rd layer) [54]. The assembling and disassembling processes are the same for the main frame layer (3rd layer) [54] and the bottom layer (4th layer) [56].

Figure 8:
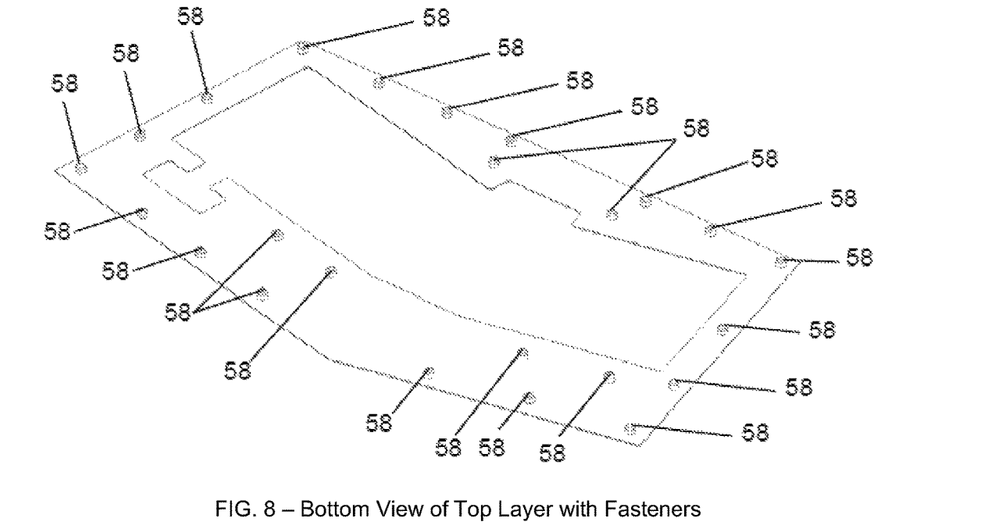
FIG. 8 illustrates the exemplary non-limiting structure(s) of the bottom view of the top layer with rare earth magnets or electromagnetic fasteners.

FIG. 8 illustrates the exemplary non-limiting structure(s) of the fasteners [58] of the top layer [50]. The fasteners [58] are constructed of ferromagnetic or non-ferromagnetic substance so that they can fit tightly into perforated holes [60] and have full contacts with the fasteners [62] on the bottom layer [56].

Figure 9:
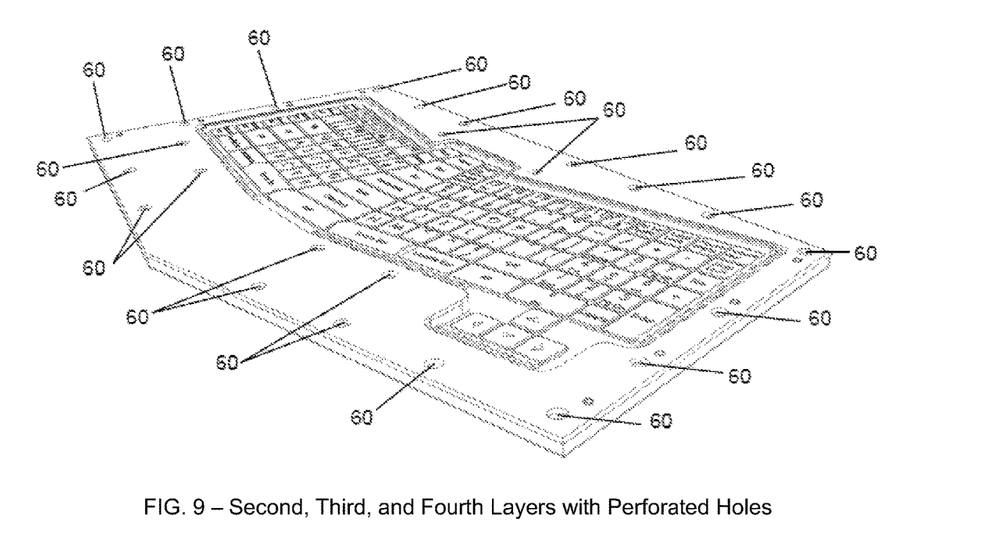
FIG. 9 illustrates the exemplary non-limiting structure(s) of the perforated openings of the transparent or translucent layer and the main frame.

FIG. 9 illustrates the exemplary non-limiting structure(s) of the perforated holes [60] on the transparent or translucent layer [52] and the main frame layer [54]. FIG. 9 further shows all keys are substantially and uniformly situated lower than the LED modules [48], creating sufficient space or gap for lightwaves from the surrounding LED modules [48] to broadcast more extensively.

Figure 10:
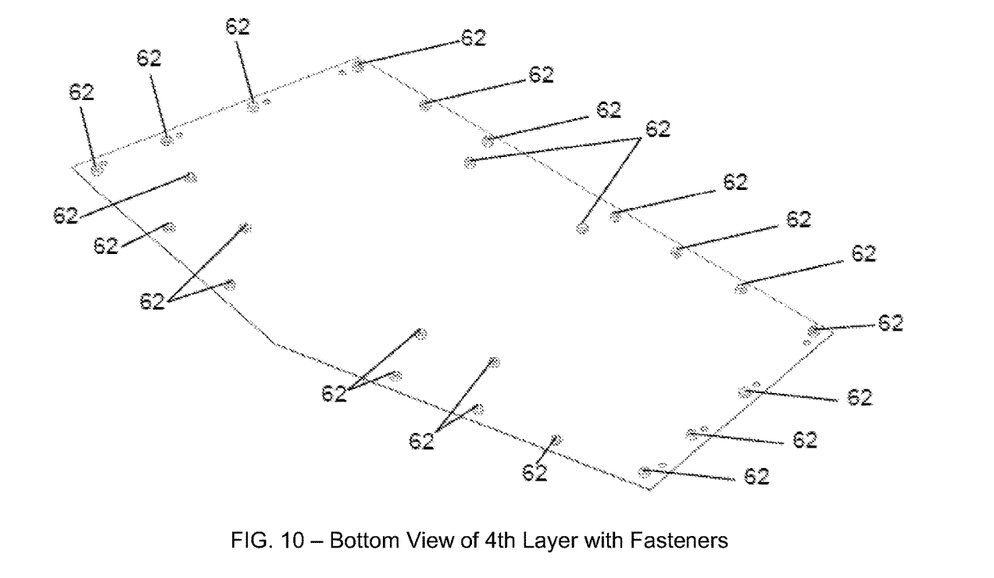
FIG. 10 illustrates the exemplary non-limiting structure(s) of the bottom View of the bottom layer with rare earth magnets or electromagnetic or non-ferromagnetic fasteners.

FIG. 10 illustrates the exemplary non-limiting structure(s) of fasteners [62] of the bottom layer (4th layer) [56]. The fasteners [62] are constructed of ferromagnetic or non-ferromagnetic substance so that they can fit tightly into the perforated holes [60] and have full contacts with the fasteners [58] on the bottom of the top layer [50].

Figure 11:
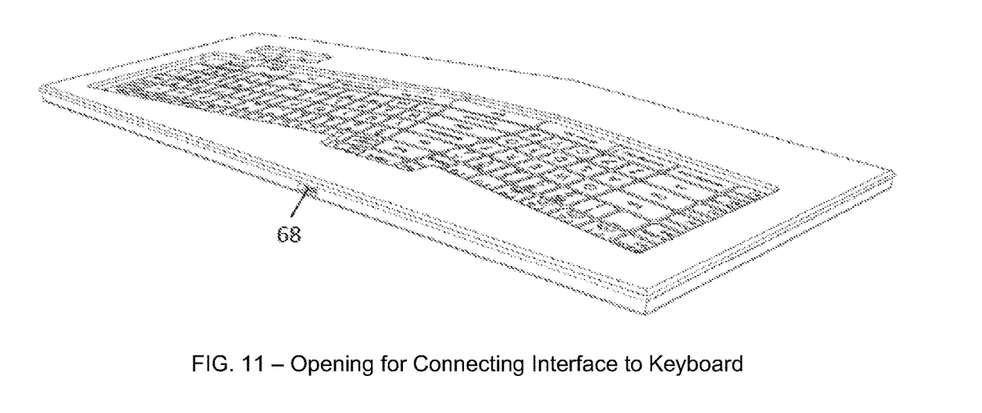
FIG. 11 illustrates the exemplary non-limiting structure(s) of the socket of the power receptacle.

FIG. 11 illustrates the exemplary non-limiting structure(s) of the opening [6] on the main frame layer (3rd layer) to allow a wired interface to pass through and to connect to the integral receptacle [70].

Figure 12:
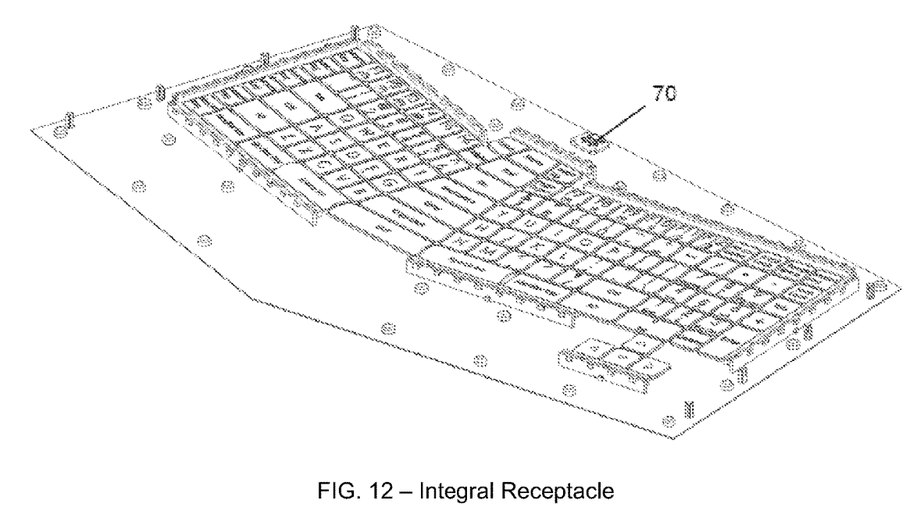
FIG. 12 illustrates the exemplary non-limiting structure(s) of the power receptacle.

FIG. 12 illustrates the exemplary non-limiting structure(s) of an integral receptacle [70] that is mounted on the printed circuit board (PCB). The unique placement and functions of the integral receptacle [70] solve the problems that exist in the conventional wired keyboards. The integral receptacle [70] allows a cable in different lengths to connect to the modular keyboard.

Figure 13:
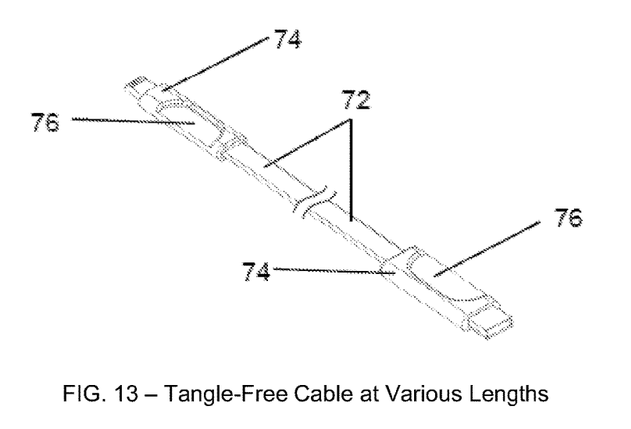
FIG. 13 illustrates the exemplary non-limiting structure(s) of Tangle-free cable and extended connector of the present invention.

FIG. 13 illustrates the exemplary non-limiting structure(s) of the embodiments of the tangle-free cable [72] that can be connected the integral receptacle [70]. The cable [72] is constructed of at least one or more wire(s) arranged in parallel to create a flat cable, which is less likely to tangle or kink comparing to the conventional twisted wires. The elongated connector [74] provides an additional length to allow an operator to effortlessly engage or disengage the cable from the keyboard or from the computer or electronic device. The hallowed spaces [76] on the connector [74] allow the fingers and/or thumbs a flat surface to grip.

FIG. 14 illustrates the exemplary non-limiting structure(s) of the angles [82] as the left section [30] and the right section [34] align perpendicularly with the middle section [32]. The angles [80] represent an optimal posture for an operator's wrists, and hands as the fingers are placed on the home rows.

Figure 15:
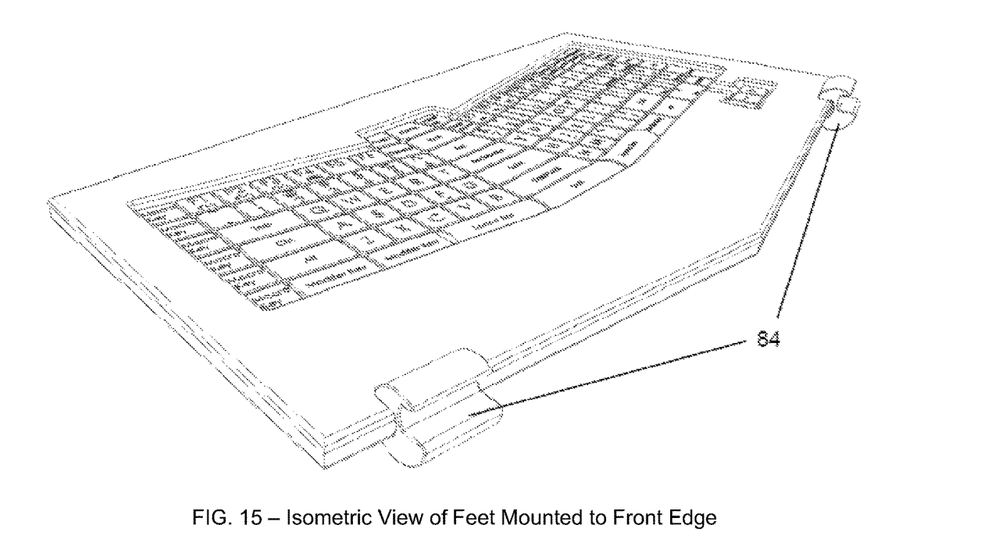
FIG. 15 illustrate the exemplary non-limiting structure(s) of adjustable, attachable, detachable feet mounted to the front of the keyboard housing.

FIG. 15 illustrates the exemplary non-limiting structure(s) of the embodiment of the adjustable, attachable, detachable feet [94] as mounted to the front [84] of the modular keyboard housing to create a negative tilt to an operator's wrists.

Figure 16:
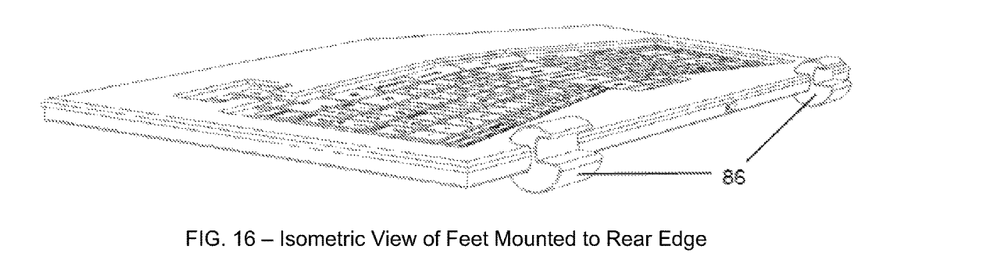
FIG. 16 illustrate the exemplary non-limiting structure(s) of adjustable, attachable, detachable feet mounted to the rear of the keyboard housing.

FIG. 16 illustrates the exemplary non-limiting structure(s) of the embodiment of the adjustable, attachable, detachable feet [94] as mounted to the rear [86] of the modular keyboard housing to create a positive tilt to an operator's wrists.

Figure 17:
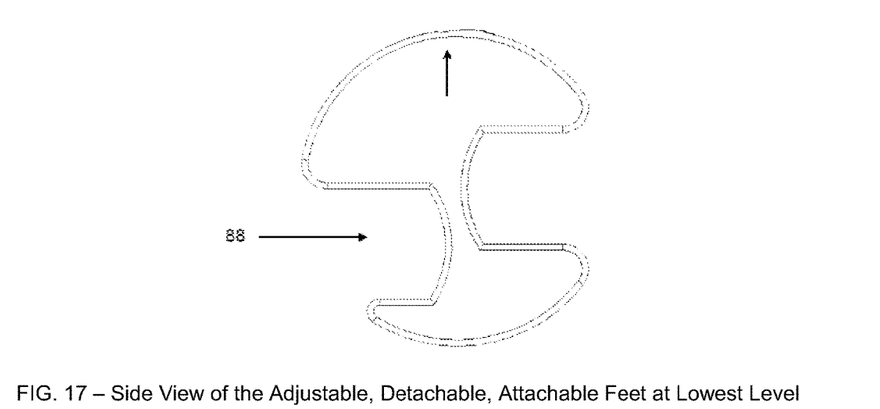
FIG. 17 illustrates the exemplary non-limiting structure(s) of the side view of the attachable or detachable feet at the lowest level.

FIG. 17 illustrates the exemplary non-limiting structure(s) of the embodiment of the side view of the adjustable, attachable, detachable feet [94] at the lowest level [88] when attached to the modular keyboard housing.

Figure 18:
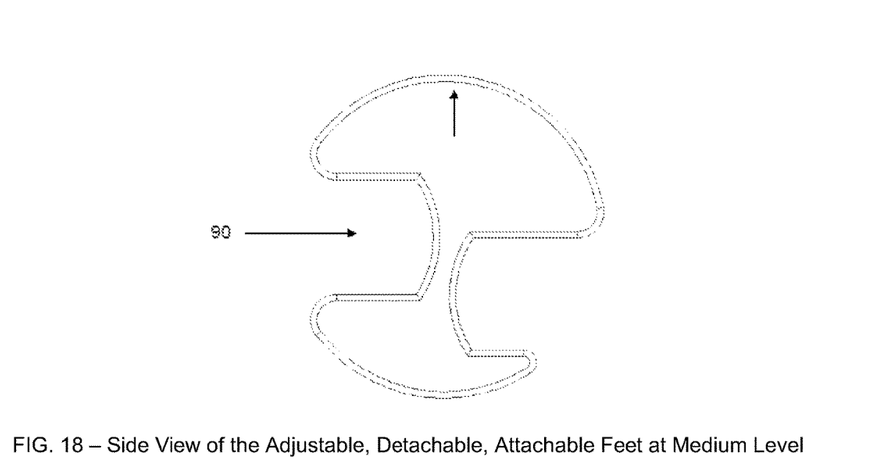
FIG. 18 illustrates the exemplary non-limiting structure(s) of the side view of the attachable or detachable feet at the middle level.

FIG. 18 illustrates the exemplary non-limiting structure(s) of the embodiment of the side view of the adjustable, attachable, detachable feet [94] at the middle level [90] when attached to the modular keyboard housing.

Figure 19:
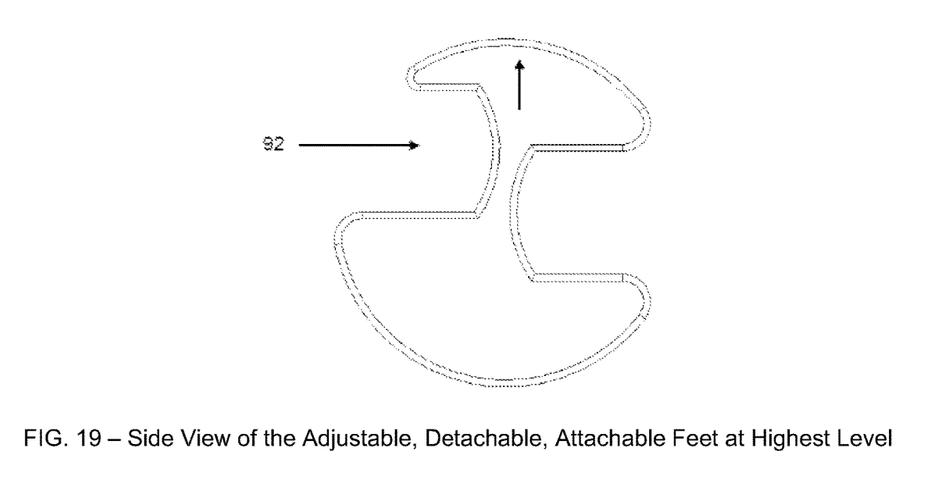
FIG. 19 illustrates the exemplary non-limiting structure(s) of the side view of the attachable or detachable feet at the highest level.

FIG. 19 illustrates the exemplary non-limiting structure(s) of the embodiment of the side view of the adjustable, attachable, detachable feet [94] at the highest level [92] when attached to the modular keyboard housing.

Figure 20:
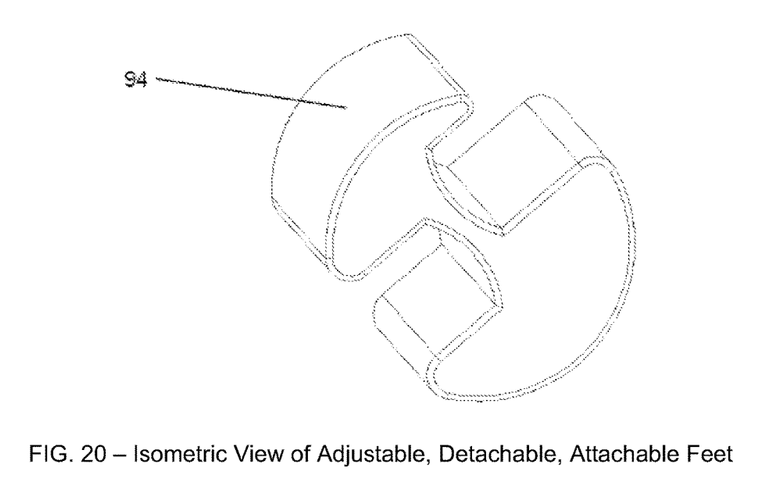
FIG. 20 illustrates the exemplary non-limiting structure(s) of the isometric view of the attachable or detachable feet.

FIG. 20 illustrates the exemplary non-limiting structure(s) of the embodiments of the isometric view of the adjustable, attachable, detachable feet [94].

CONCLUSION, RAMIFICATIONS, AND SCOPE

As applicable, described features of the invention can be implemented using compiled software or machine code to provide inputs to processor(s) to process predefined outputs on fixed terminals, entertainment consoles, portable, handheld, tablet, and wearable devices.

The keyboard layout of the present invention can be implemented via projection of visible light on vertical or horizontal surfaces, visual displays, touchscreen displays, and mechanical and electromechanical typewriters including or excluding the touchpad.

Furthermore, the QWERT keyboard can be used for character sets like and Arabic, Chinese, Devanagari, Japanese, Russian, Spanish, Vietnamese, and so on. The Computer Keyboard would also provide the users with a logical arrangement of the letters consistent with their learning of the English language.

The various non-limiting designs of the present invention have been illustrated and described above; however, the features in these embodiments may be implemented on other input devices such as computer mice, handheld controllers, electronic consoles, and so on.

Although specific embodiments of the present invention have been disclosed, it is to be understood that various different modifications are possible and are contemplated within the true spirit and scope of the appended claims. There is no intention, therefore, of limitation to the exact abstract or disclosure herein presented.

The scope of the present invention is further entailed in the claims below.

The invention claimed is:
1. A keyboard comprising:
adjustable, attachable, detachable feet having a first mounting opening configured to receive an edge of the keyboard to hold the keyboard at a first height and a second mounting opening recessed into the feet opposite the first mounting opening and configured to receive the edge of the keyboard and hold the keyboard at a second height as an alternative configuration;
the feet having curved edges;
wherein said first and second mounting openings provide various tilt adjustments to a modular keyboard housing of the keyboard via different configurations of said feet mounted to the modular keyboard housing, said modular keyboard housing is at lowest elevation by having said feet mounted to said modular keyboard housing using the first opening, said modular keyboard housing is at middle elevation by having said feet mounted to said modular keyboard housing using the second opening, and said modular keyboard housing is at highest elevation by having said feet mounted to said modular keyboard housing using the first opening when said feet is flipped vertically, wherein said feet are mounted to the front of said modular keyboard housing to provide negative tilt to an operator's hands and wrists, or positive tilt to said hands and wrists as said feet are mounted to the rear of said keyboard housing, and said hands and wrists are in neutral angle as said feet are dismounted from said modular keyboard housing; and
one or more LEDs for transmitting visible, invisible wavelengths, short-wavelength ultraviolet radiation (UV-C), germicidal UV, and non-germicidal lightwaves onto the surface of said key caps/keycaps of the keys of the keyboard and periphery.

* * * * *